(12) United States Patent
Kelly

(10) Patent No.: US 8,472,119 B1
(45) Date of Patent: Jun. 25, 2013

(54) IMAGE WAVEGUIDE HAVING A BEND

(75) Inventor: Daniel G. Kelly, San Jose, CA (US)

(73) Assignee: Google Inc., Mountain View, CA (US)

( * ) Notice: Subject to any disclaimer, the term of this patent is extended or adjusted under 35 U.S.C. 154(b) by 95 days.

(21) Appl. No.: 13/209,252

(22) Filed: Aug. 12, 2011

(51) Int. Cl.
*G02B 27/14* (2006.01)
*G09G 5/00* (2006.01)

(52) U.S. Cl.
USPC .............................................. 359/630; 345/8

(58) Field of Classification Search
USPC ........... 359/629–632; 345/7–9; 362/607–609, 362/618, 624, 629
See application file for complete search history.

(56) References Cited

U.S. PATENT DOCUMENTS

| | | |
|---|---|---|
| 4,711,512 A | 12/1987 | Upatnieks |
| 5,076,664 A | 12/1991 | Migozzi |
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |

(Continued)

FOREIGN PATENT DOCUMENTS

| | | |
|---|---|---|
| GB | 2272980 A | 6/1994 |
| WO | WO96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Alicia M Harrington
(74) *Attorney, Agent, or Firm* — Blakely Sokoloff Taylor & Zafman LLP

(57) ABSTRACT

An optical apparatus having a waveguide that includes a bend, a first segment and a second segment operatively coupled at the bend, the first and second segments each including a pair of reflective surfaces being substantially parallel and opposing each other. An in-coupling region receives light into the first segment of the waveguide, and an out-coupling region allows the light to exit the second segment of the waveguide. A light filtering region disposed near the bend between the first segment of the waveguide and the second segment of the waveguide will selectively filter light transmitted from the first segment of the waveguide to the second segment of the waveguide.

23 Claims, 7 Drawing Sheets

U.S. PATENT DOCUMENTS

| | | |
|---|---|---|
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitari |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitari |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0213664 A1 | 9/2011 | Osterhout et al. |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

IMAGE WAVEGUIDE HAVING A BEND

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. The former type of HDM is often referred to as virtual reality while latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, form factor, and efficiency of conventional optical systems used to implement existing HMDs.

SUMMARY

Implementations of techniques, apparatuses, and systems are provided for an image waveguide for use in a heads-up-display capable of providing a virtual reality or an augmented reality to a user. In one aspect, the image waveguide has a bend and includes a first segment and a second segment operatively coupled at the bend, the first and second segments each including a pair of reflective surfaces being substantially parallel and opposing each other; an in-coupling region for receiving light into the first segment of the waveguide; an out-coupling region to allow the light to exit the second segment of the waveguide; and a light filtering region disposed near the bend between the first segment of the waveguide and the second segment of the waveguide to selectively filter light transmitted from the first segment of the waveguide to the second segment of the waveguide.

These and other aspects and embodiments are described in detail in the drawings, the description, and the claims.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It will be appreciated that the following figures are not necessarily drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of an apparatus, system and method to utilize a waveguide having a bend are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
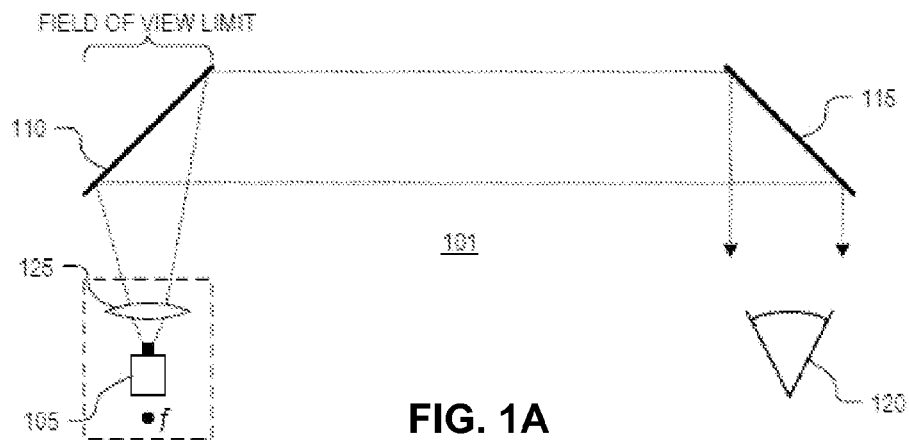
FIG. 1A illustrates a first conventional near-to-eye optical system using an input lens and two mirrors in accordance with an embodiment of the disclosure.

FIG. 1A illustrates a first conventional near-to-eye optical system 101 using an input lens and two mirrors according to an embodiment of the disclosure. An image source 105 outputs an image that is reflected by two mirrors 110 and 115, which form an image near to eye 120. Image source 105 is typically mounted above the head or to the side of the head, while mirrors 110 and 115 bend the image around the front of the viewer's face to their eye 120. Since the human eye is typically incapable of focusing on objects placed within a few centimeters, this system requires a lens 125 interposed between the first mirror 110 and image source 105. Lens 125 creates a virtual image that is displaced further back from the eye than the actual location of mirror 115 by positioning image source 105 inside of the focal point $f$ of lens 125. Optical system 101 suffers from a relatively small field of view (e.g., approximately 20 degrees) limited by the extent of mirrors 110 and 115 and the bulkiness of lens 125. The field of view can be marginally improved by placing mirrors 110 and 115 within a high index material to compress the angles of incidence, but is still very limited and the thickness of the waveguide rapidly increases to achieve larger fields of view, adversely affecting the form factor of system 101.

Figure 1B:
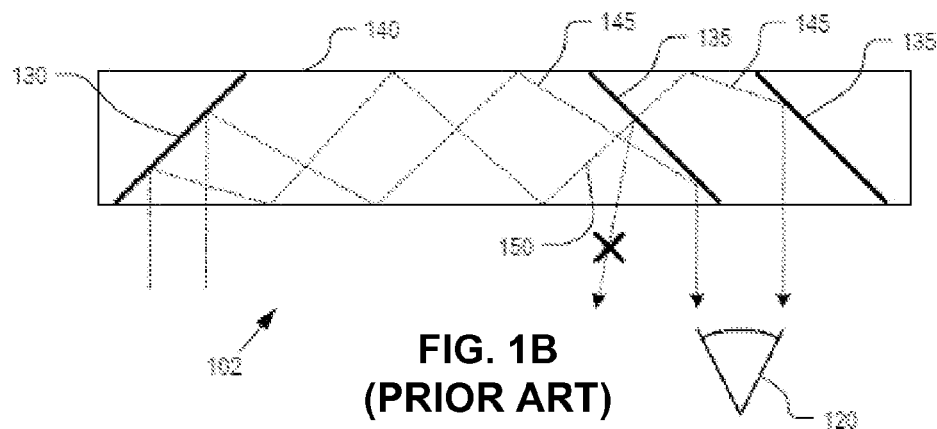
FIG. 1B illustrates a second conventional near-to-eye optical system using angle sensitive dichroic mirrors in accordance with an embodiment of the disclosure.

FIG. 1B illustrates a second conventional near-to-eye optical system 102 using angle sensitive dichroic mirrors according to an embodiment of the disclosure. Optical system 102 includes a single in-coupling mirror 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output mirrors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, optical system 102 still has a non-ideal form factor and the nature of dichroic mirrors 135 that passes some incident angles while reflecting others limits the field of view optical system 102 and the dichroic mirror coating does not provide sharp angular cut-offs, resulting in ghosting effects.

Figure 1C:
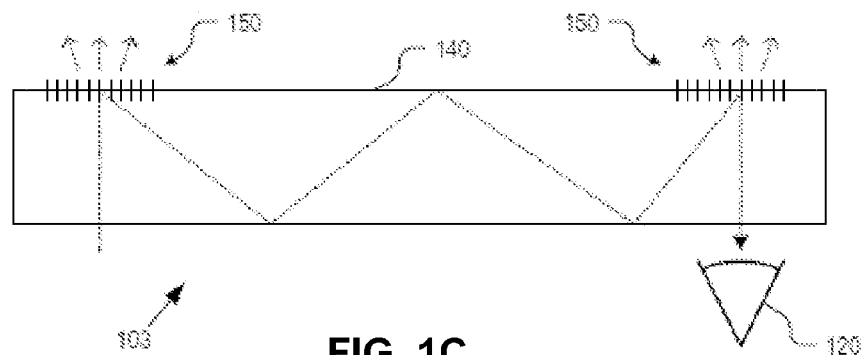
FIG. 1C illustrates a third conventional near-to-eye optical system using holographic diffraction gratings in accordance with an embodiment of the disclosure.

FIG. 1C illustrates a third conventional near-to-eye optical system 103 using holographic diffraction gratings. Optical system 103 is similar to optical system 102, but uses holographic diffraction gratings 150 in place of mirrors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly. Again, optical system 103 suffers from a limited field of view and a non-ideal form factor.

Figure 2:
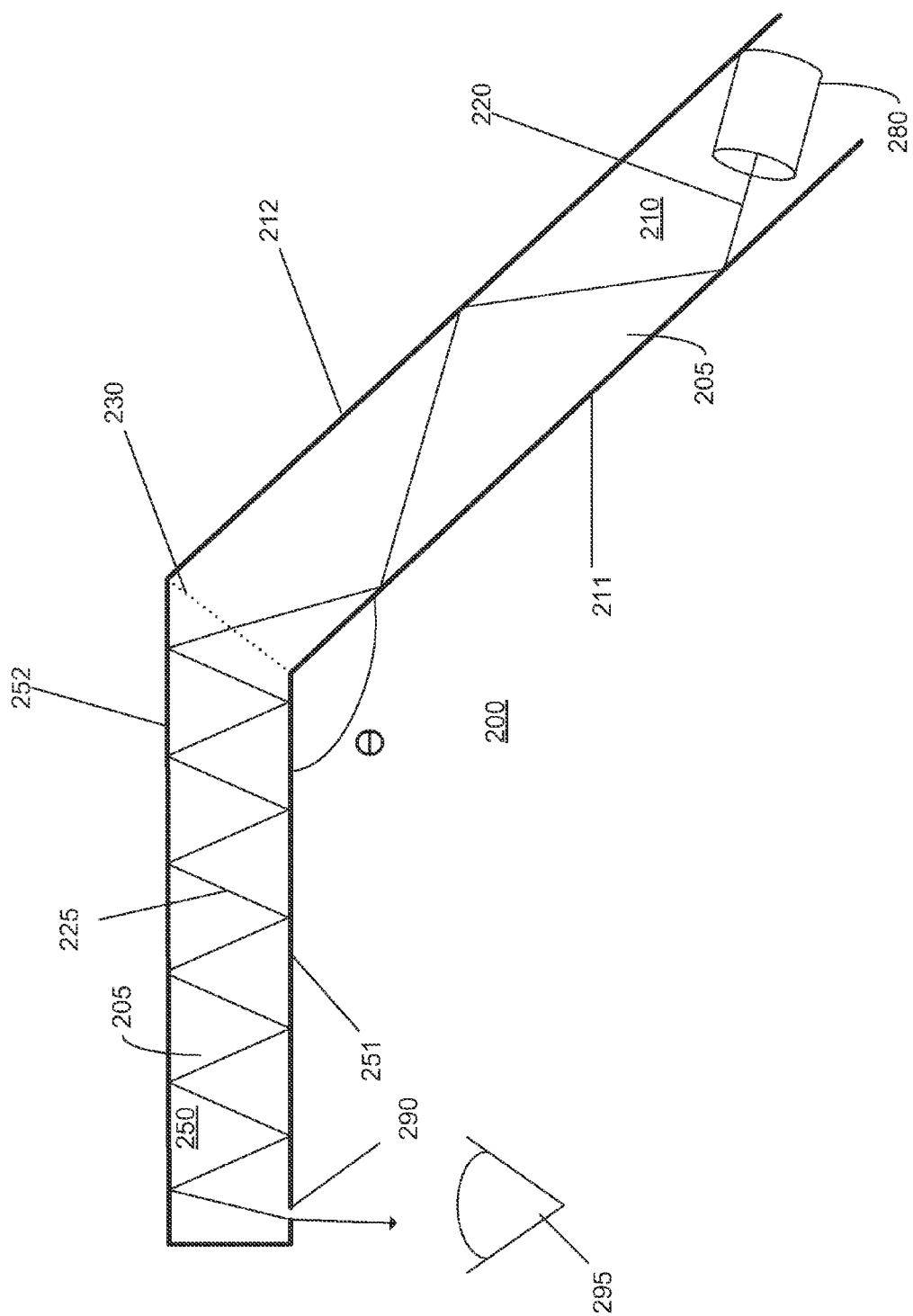
FIG. 2 illustrates a waveguide with a bend in accordance with an embodiment of the disclosure.

FIG. 2 illustrates a waveguide with a bend in accordance with an embodiment of the disclosure. The illustrated embodiment is a cross-sectional view of an image waveguide for generating a near-to-eye image. Waveguide 200 includes first segment 210 which receives substantially collimated light 220 from light source 280. Said light is propagated through the waveguide segment 210 via surfaces 211 and 212, which comprise reflective material and are substantially parallel to one another. In one embodiment, light 220 is guided by total internal reflection ("TIR").

Waveguide 200 further includes second segment 250, which receives light from first segment 210 as light 225. Said light is propagated through the waveguide segment via surfaces 251 and 252, which comprise reflective material and are substantially parallel to one another. In one embodiment, light 225 is guided by TIR. In the illustrated embodiment, waveguide 200 includes two planar waveguides that are bonded at bend 230. In one embodiment, waveguide segments 210 and 250 are each a single piece injection molded waveguide segment.

Light 225 exits out of out-coupling region 290 towards a user's eye 295 to display a computer generated image (CGI) to the user. Out-coupling region 290 may comprise openings, diffraction gratings, non-reflective optically transmissive regions, or any functionally equivalent means to allow light to exit waveguide 200. In the illustrated embodiment, out-coupling region 290 is configured to direct light 225 towards the user's eye 295 along a path substantially normal to surface 251.

As can be seen in the illustrated embodiment, waveguide segment 210 and waveguide segment 250 are angled relative to one another to form a bend angle Θ for waveguide 200. In some embodiments, Θ is equal to or greater than 90 degrees. Thus, waveguide 200 includes bend 230, formed where waveguide section 210 couples to waveguide 250. Surfaces 211, 212, 251 and 252 form waveguide core 205, which may comprise air, glass, quartz, acrylic, plastic or any other optically transparent material.

Embodiments of the invention such as waveguide 200 may be used in a single eye display (i.e., a monocular HMD) or a dual eye display (i.e., a binocular HMDs). Waveguide 200 may be used to display only a CGI (i.e., a virtual reality (VR) system) wherein at least reflective surface 252 of waveguide segment 250 is fabricated with a non-optically transmissive material—e.g., a reflective metal film, such as, aluminum, nickel, gold, chromium, tin, or otherwise. In one embodiment, reflective surfaces of waveguide 200 are fabricated using partially reflective layers or a dichroic film, which enables wavelength selectivity for specific transmission and reflection behavior.

Waveguide 200 may also be used in an HMD capable of superimposing CGI over a real-world view (i.e., an augmented reality (AR) system) where the user's image of the world is augmented with an overlaying CGI, also referred to as a heads-up display (HUD). For HUDs, at least both reflective surfaces 251 and 252 of waveguide segment 250 are fabricated of a partially transmissive material to permit external ambient light to pass through to eye 295.

In one embodiment, light enters waveguide 200 and traverse waveguide segments 210 and 250 at sufficiently oblique angles that it is guided within the waveguide via TIR. In one embodiment that uses TIR, waveguide 200 is fabricated of a polymer material having an index of refraction of approximately 1.5. In one embodiment that uses non-optically transmissive material to fabricate waveguide 200, it is understood that TIR in not required to guide light within the waveguide. A combination of TIR and non-optically transmissive material may also be used (e.g., waveguide segment 210 is fabricated from non-optically transmissive material, while waveguide segment 250 is fabricated from optically transmissive material).

Figure 3:
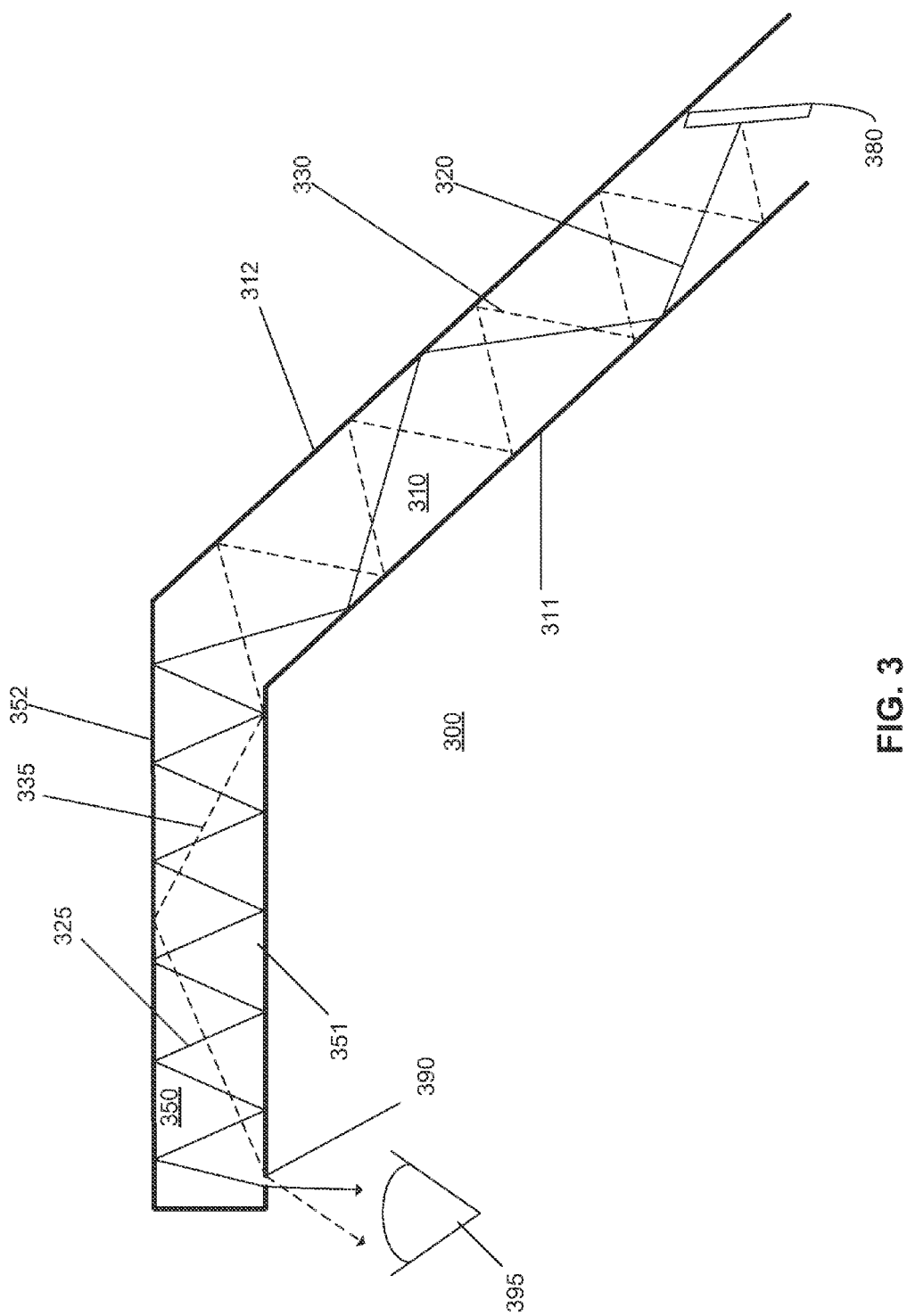
FIG. 3 illustrates a waveguide with a bend in accordance with an embodiment of the disclosure.

FIG. 3 illustrates a waveguide with a bend in accordance with an embodiment of the disclosure. The illustrated embodiment is a cross-sectional view of an image waveguide for generating a near-to-eye image. It is understood that forming a waveguide having a bend may cause any light that has some divergence to be transferred between the first and second segments at different angles. For example, waveguide 300 is shown to include first segment 310 and second segment 350. Segment 310 includes parallel surfaces 311 and 312, while segment 350 includes segments 351 and 352. Segments 311 and 351 form an "inner bend" while segments 312 and 352 form an "outer bend."

Light source 380 may emit substantially collimated light, with some spatial extent or light divergence present (e.g., due to imperfections in the light source). As shown in the illustration, light source 380 emits light with some divergence—i.e., light 330 and light 320 are emitted from the same point, but light 330 diverges from light 320 (the divergence in this example has been accentuated to illustrate the effect described below). When light is transferred from segment 310 to segment 350, the last reflection before transfer between the segments is a reflection off either bottom surface 311 or top surface 312.

In this embodiment, the light reflected from bottom surface 311 (shown as light 320) of waveguide segment 310 is received by top surface 352 of waveguide segment 350 (shown as light 325) at an angle that allows the light to propagate through the rest of the waveguide (e.g., at an angle that enables TIR); however, divergent light 330 may be reflected from top surface 312 of waveguide segment 310, rather than the bottom surface, just prior to entering the second waveguide section 350. For example, divergent light 330 may reflect off of top surface 312 and enter into waveguide segment 350 at a different angle (shown as light 335) than light 325. In the illustrated embodiment, out-coupling region 390 is configured to direct light 325 towards the user's eye 395 sufficiently close to normal; however, light 335 exits at a different angle.

For proper operation, waveguide 300 should preserve a one-to-one relation of input light angles to output light angles so that the output light is also substantially collimated and therefore virtually projected at or near infinity. In this example, light 325 and light 335 arrive at the user's eye 395 at different angles and therefore light originating from a common point in image source 380 is delivered to eye 395 with two different angles due to a finite divergence of the cone of light emitted from image source 380. This may produce the undesired effect of dual or blurred images for the user.

Figure 4:
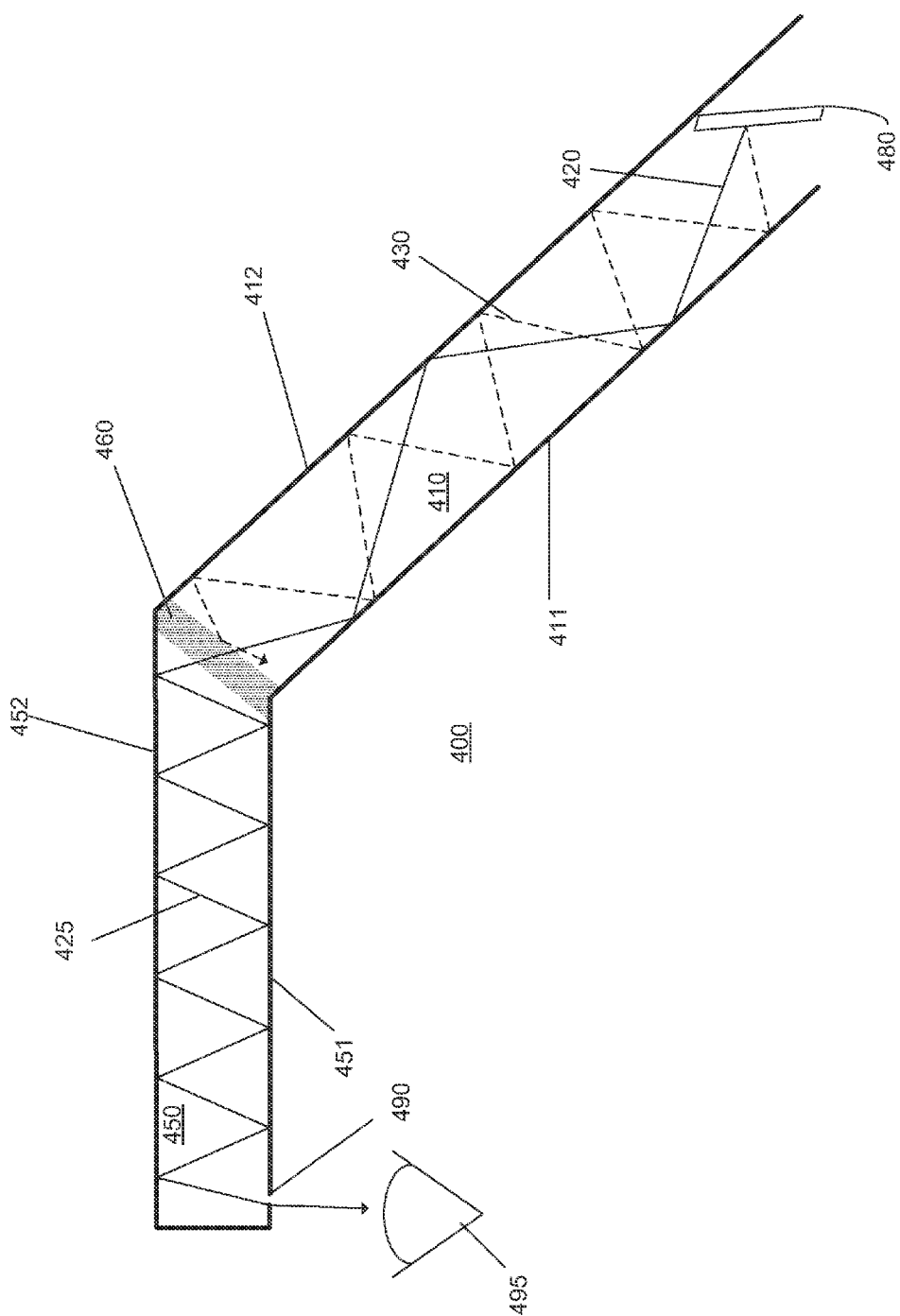
FIG. 4 illustrates a waveguide with an angle-selective region in accordance with an embodiment of the disclosure.

FIG. 4 illustrates a waveguide with an angle-selective region in accordance with an embodiment of the disclosure. The illustrated embodiment is a cross-sectional view of an image waveguide for generating a near-to-eye image. In this embodiment, waveguide 400 receives light from light source 480, and includes first segment 410 having parallel, reflective surfaces 411 and 412, and second segment 450 having parallel, reflective surfaces 451 and 452. In this embodiment, angle selective region 460 is formed between first and second segments 410 and 450 and selectively filters light transmitted from the first segment to the second segment. Angle selective region 460 may be an angle sensitive dichroic mirror that passes light in a first angle range while reflecting light in a second angle range.

In this embodiment, light 420 reflects off of surface 411 and enters the bend at an allowable angle (e.g., sufficiently close to normal), and this light is permitted to pass through region 460, and into waveguide segment 450 as light 425. Divergent light 430 reflects off of surface 412 enters the bend at a filtered angle (e.g., having a sufficiently oblique incidence), and region 460 is configured to reject this particular angle of light. Thus, light 430 is reflected back into region 410.

Therefore, waveguide 400 rejects divergent light 430, thereby preserving a one-to-one relation of input light angles to output light angles so that only substantially collimated output light arrives at out-coupling region 490 and is received by eye 495 of a user. It is to be understood that while in this embodiment, light reflected off the "outer bend" of waveguide 400 is rejected, in other embodiments light reflected off of an "inner bend" of a waveguide may be rejected.

Figure 5:
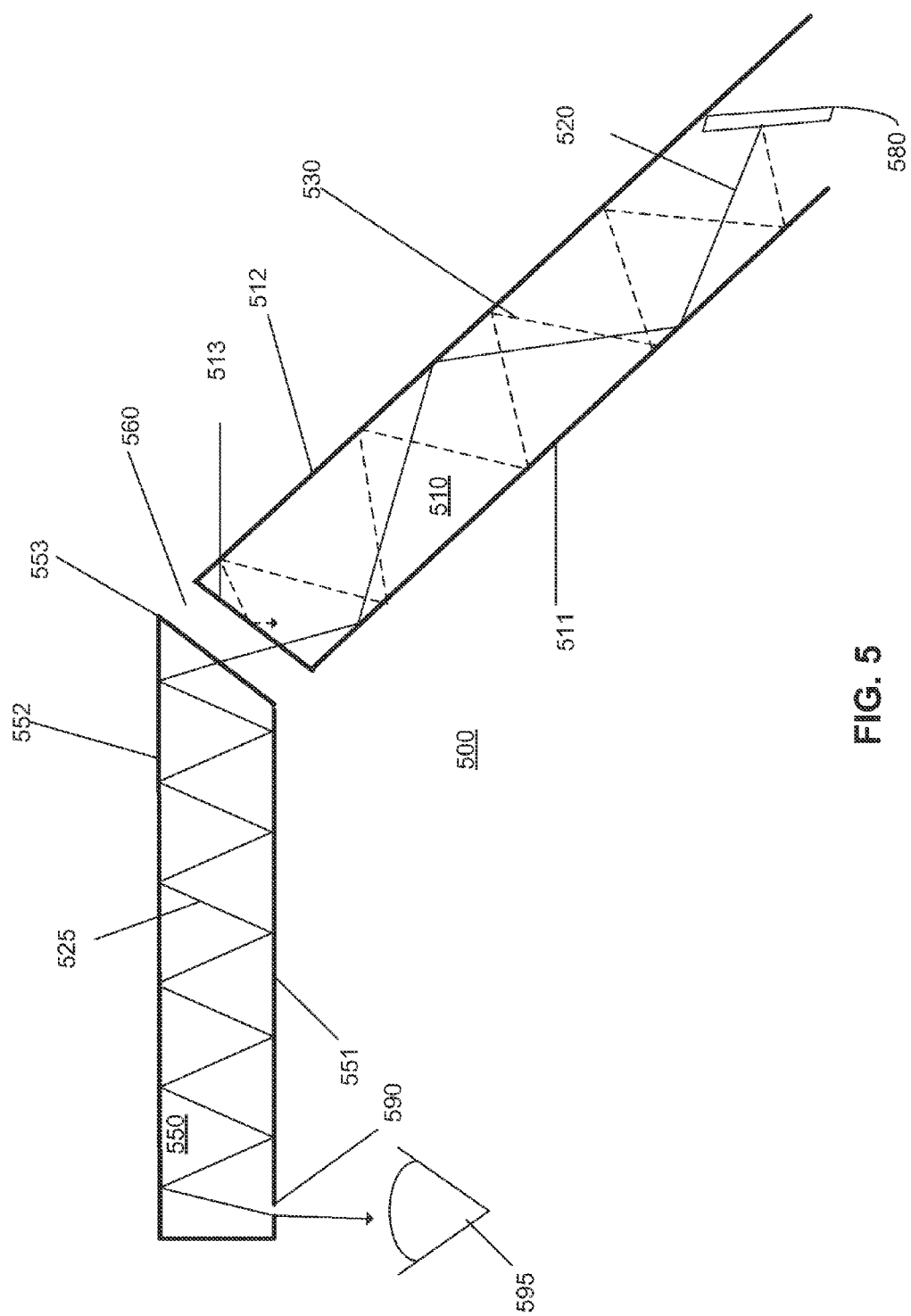
FIG. 5 illustrates a waveguide with an angle-selective region in accordance with an embodiment of the disclosure.

FIG. 5 illustrates a waveguide with an angle-selective region in accordance with an embodiment of the disclosure. The illustrated embodiment is a cross-sectional view of an image waveguide for generating a near-to-eye image. In this embodiment, waveguide 500 receives substantially collimated light from light source 580 and includes first segment 510 having parallel, reflective surfaces 511 and 512, and second segment 550 having parallel, reflective surfaces 551 and 552. In this embodiment, angle selective region 560 is formed between first and second segments 510 and 550 and selectively filters light transmitted from the first segment to the second segment. Angle selective region 560 is formed by surfaces 513 and 553, which are parallel to each other. In one embodiment, region 560 comprises an air gap between surfaces 513 and 553.

In this embodiment, light 520 enters the bend reflected off of bottom surface 511 of waveguide segment 510, and region 560 is configured such that this light enters segment 550 sufficiently close to normal, and proceeds to propagate into segment 550 as light 525. In contrast, divergent light 530 enters the bend as an immediate reflection off of top surface 512, and region 560 is configured to reject this particular angle of light; specifically, light 530 cannot pass through surface 513 due to its large angle of incidence (e.g., light 530 is not close enough to normal) and is therefore rejected by TIR at surface 513. Thus, light 530 reflects back into waveguide segment 510.

Therefore, region 560 eliminates one of the angles of light produced at the bend of the waveguide, thereby preserving a one-to-one relation of input light angles to output light angles so that collimated output light arrives at out-coupling region 590 and is received by eye 595 of a user.

Figure 6A:
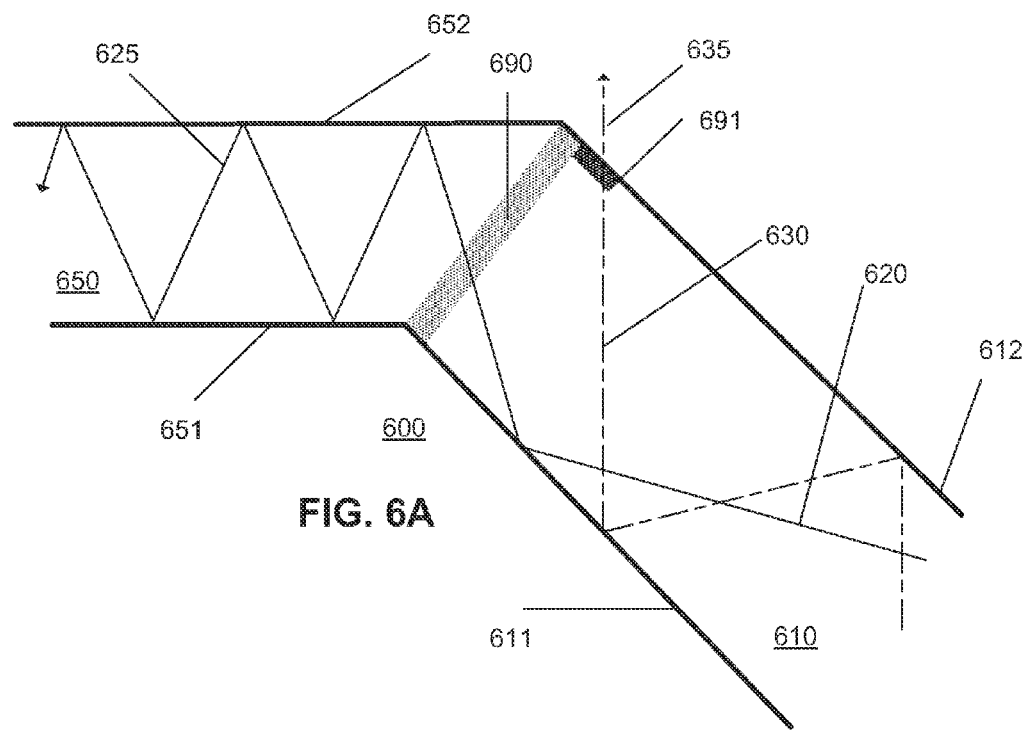
FIG. 6A and FIG. 6B illustrate waveguides with an angle-selective region and an anti-reflective region in accordance with embodiments of the disclosure.
Figure 6B:
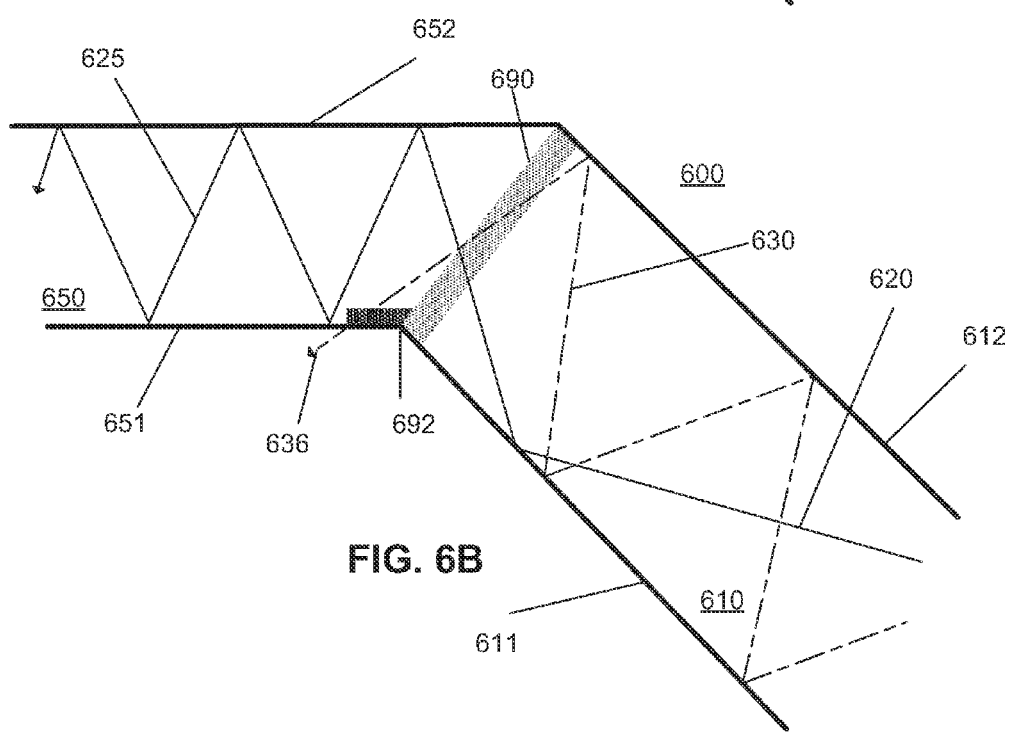

FIG. 6A and FIG. 6B illustrate waveguides with an angle-selective region and an anti-reflective region in accordance with embodiments of the disclosure. The illustrated embodiment of FIG. 6A is a cross-sectional view of a portion of an image waveguide for generating a near-to-eye image. In this embodiment, waveguide 600 includes first segment 610 having parallel, reflective surfaces 611 and 612, and second segment 650 having parallel, reflective surfaces 651 and 652. In this embodiment, angle selective region 690 is formed between first and second segments 610 and 650 to selectively filter light transmitted from the first segment to the second segment. In this embodiment, region 690 is configured to reject divergent light reflected off of top surface 612 of waveguide segment 610 (shown as light 630), while allowing light reflected off of bottom surface 611 (shown as light 620) to pass through the region and into waveguide segment 650 (shown as light 625).

It is understood that region 690 may not successfully reject all divergent light reflected from top surface 612. For example, imperfections in the surface of region 690 may exist that allow some light to pass through the region and into waveguide segment 650 that would otherwise be rejected.

Embodiments of the invention may utilize anti-reflective regions disposed near region 690 to reduce the possibility of light erroneously passing through the region. In the embodiment illustrated in FIG. 6A, to account for possible imperfections in the surface of region 690, reflective surface 612 includes anti-reflective region 691 disposed near angle selective region 690 to emit light 635 from the waveguide as this light should be rejected by the region.

In the embodiment illustrated in FIG. 6B, to account for possible imperfections in the surface of region 690, reflective surface 651 includes anti-reflective region 692 disposed near angle selective region 690 to emit light 636, reflected from top surface 612, from the waveguide as this light should have been rejected by the region. Thus, anti-reflective region 692 is provided as an additional backup to encourage early emission of light 636 that happens to make it through angle selective region 690 by inhibiting TIR in the localized region of anti-reflection region 692.

Figure 7:
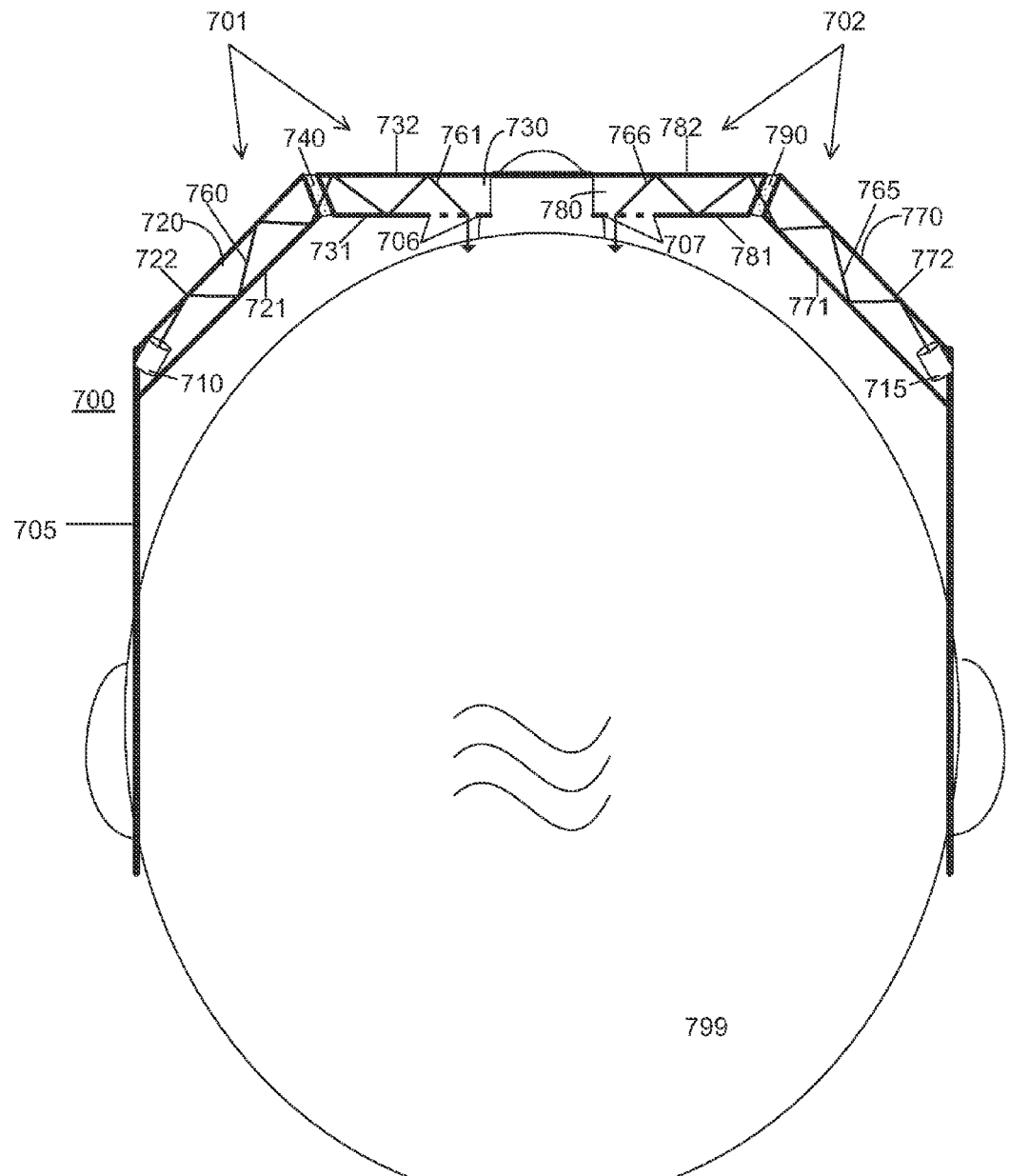
FIG. 7 is a top view of a demonstrative near-to-eye imaging system in accordance with an embodiment of the disclosure.

FIG. 7 is a top view of a demonstrative near-to-eye imaging system in accordance with an embodiment of the disclosure.

The illustrated embodiment of imaging system 700 includes two image waveguides 701 and 702, frame 705 including a nose assembly, a left ear assembly, and a right ear assembly, and two image sources 710 and 715.

In this embodiment, image waveguides 701 and 702 are secured into an eye glass arrangement that can be worn on head 799 of a user. The left and right ear assemblies rest over the user's ears while the nose assembly rests over the user's nose. The frame assembly is shaped and sized to position out-coupling regions 706 and 707 of each image waveguide in front of a corresponding eye of the user with the emission surfaces facing the eyes. Out-coupling regions 706 and 707 may comprise openings, diffraction gratings, non-reflective optically transmissive regions, or any functionally equivalent means to allow light to exit waveguide segments 732 and 782, respectively.

Left and right (binocular embodiment) CGIs are generated by image sources 710 and 715, respectively. Image sources 710 and 715 may be implemented using liquid crystal on silicon ("LCoS") displays, back-lit LCDs, organic LED displays, quantum dot array displays, or otherwise. In one embodiment, image sources 710 and 715 generate substantially collimated light. Of course, other display technology may be used. The CGI output by image sources 710 and 715 is launched into their respective image waveguides, 701 and 702. Each of said waveguides has a bend. In this embodiment, waveguide 701 includes a bend formed by segment 720 (having parallel surfaces 721 and 722) and segment 730 (having parallel surfaces 731 and 732). Light filtering region 740 selectively transfers CGI light of image source 710 from segment 720 (shown as light 760) to segment 730 (shown as light 765). Waveguide 702 includes a bend formed by segment 770 (having parallel surfaces 771 and 772) and segment 780 (having parallel surfaces 781 and 782). Light filtering region 790 will selectively transfer CGI light of image source 715 from segment 770 (shown as light 765) to segment 780 (shown as light 766). The angle sensitive filtering regions are provided at the bends to selectively filter the CGI light, since even substantially collimated light has some divergence, which can distort the image at the bends. Waveguides 701 and 702 have the above described bend to improve the form factor of imaging system 700, while preserving a one-to-one relation of input light angles to output light angles.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus comprising:
    a waveguide having a bend and including a first segment and a second segment operatively coupled at the bend, the first and second segments each including a pair of reflective surfaces being substantially parallel and opposing each other to guide light along an optical path disposed at least partially between the reflective surfaces;
    an in-coupling region to receive the light into the first segment of the waveguide;
    an out-coupling region to allow the light to exit the second segment of the waveguide; and
    a light filtering region disposed near the bend between the first segment of the waveguide and the second segment of the waveguide to selectively filter light transmitted from the first segment of the waveguide to the second segment of the waveguide.

2. The optical apparatus of claim 1, wherein the light filtering region is angle selective to reject the light when incident upon the light filtering region as an immediate reflection off of a first one of the pair of reflective surfaces and to pass the light when incident upon the light filtering region as an immediate reflection off of a second one of the pair of reflective surfaces.

3. The optical apparatus of claim 2, wherein the first one of the pair of reflective surfaces comprises an outer bend surface of the waveguide while the second one of the pair of reflective surfaces comprises an inner bend surface of the waveguide.

4. The optical apparatus of claim 2, wherein the light filtering region comprises a dichroic minor.

5. The optical apparatus of claim 2, wherein the light filtering region comprises an index change region that passes or rejects the light based upon total internal reflection.

6. The optical apparatus of claim 5, wherein the index change region comprises an air gap that is at least partially formed from an entering surface of the second segment of the waveguide and an exiting surface of the first segment of the waveguide substantially parallel and opposing the entering surface of the second segment of the waveguide.

7. The optical apparatus of claim 3, wherein one of the inner or outer bend surfaces of the waveguide includes an anti-reflective region disposed near the light filtering region to emit light transmitted through the light filtering region that should have been rejected by the light filter region.

8. The optical apparatus of claim 1, wherein an angle of the bend of the waveguide is at least ninety degrees.

9. The optical apparatus of claim 1, wherein the pair of reflective surfaces of the first segment each comprise a non-optically transmissive surface.

10. The optical apparatus of claim 1, wherein the pair of reflective surfaces of the second segment each comprise an optically transmissive surface that guides the light via total internal reflection while permitting external light to pass through the second segment, and wherein the out-coupling region changes an angle of incidence of the light to exceed a critical angle for total internal reflection such that the light exits the second segment of the waveguide.

11. The optical apparatus of claim 10, wherein the pair of reflective surfaces of the second segment each comprise wire grid polarizers.

12. A head mounted display for rendering an augmented reality to a user, the head mounted display comprising:
    a waveguide including:
    a bend;
    a first segment and a second segment operatively coupled at the bend, the first and second segments each including a pair of reflective surfaces being substantially parallel and opposing each other to guide light along an optical path disposed at least partially between the reflective surfaces;
    an in-coupling region to receive the light into the first segment of the waveguide;
    an out-coupling region to allow the light to exit the second segment of the waveguide; and a light filtering region disposed near the bend between the first segment of the waveguide and the second segment of the waveguide to selectively filter light transmitted from the first segment of the waveguide to the second segment of the waveguide;

an image source positioned to launch a computer generated image into the in-coupling region of the waveguide; and a frame assembly to support the waveguide and the image source for wearing on a head of the user.

13. The head mounted display of claim 12, wherein the light filtering region is angle selective to reject the light when incident upon the light filtering region as an immediate reflection off of a first one of the pair of reflective surfaces and to pass the light when incident upon the light filtering region as an immediate reflection off of a second one of the pair of reflective surfaces.

14. The head mounted display of claim 13, wherein the first one of the pair of reflective surfaces comprises an outer bend surface of the waveguide while the second one of the pair of reflective surfaces comprises an inner bend surface of the waveguide.

15. The head mounted display of claim 13, wherein the light filtering region comprises a dichroic mirror.

16. The head mounted display of claim 13, wherein the light filtering region comprises an index change region that passes or rejects the light based upon total internal reflection.

17. The head mounted display of claim 16, wherein the index change region comprises an air gap that is at least partially formed from an entering surface of the second segment of the waveguide and an exiting surface of the first segment of the waveguide substantially parallel and opposing the entering surface of the second segment of the waveguide.

18. The head mounted display of claim 14, wherein one of the inner or outer bend surfaces of the waveguide includes an anti-reflective region disposed near the light filtering region to emit light transmitted through the light filtering region that should have been rejected by the light filtering region.

19. The head mounted display of claim 12, wherein an angle of the bend of the waveguide is at least ninety degrees.

20. The head mounted display of claim 12, wherein the pair of reflective surfaces of the first segment each comprise a non-optically transmissive surface.

21. The head mounted display of claim 12, wherein the pair of reflective surfaces of the second segment each comprise an optically transmissive surface that guides the light via total internal reflection while permitting ambient external light to pass through the second segment, and wherein the out-coupling region changes an angle of incidence of the light to exceed a critical angle for total internal reflection such that the light exits the second segment of the waveguide.

22. The head mounted display of claim 21, wherein the pair of reflective surfaces of the second segment each comprise wire grid polarizers.

23. The head mounted display of claim 12, wherein the head mounted display comprises a binocular head mounted display, the head mounted display further comprising:

an additional waveguide; and an additional image source positioned to launch another computer generated image into an in-coupling region of the additional waveguide, wherein the frame assembly is coupled to support the waveguides and the image sources for wearing on a head of the user.

* * * * *

UNITED STATES PATENT AND TRADEMARK OFFICE
CERTIFICATE OF CORRECTION

| | | |
|---|---|---|
| PATENT NO. | : 8,472,119 B1 | Page 1 of 1 |
| APPLICATION NO. | : 13/209252 | |
| DATED | : June 25, 2013 | |
| INVENTOR(S) | : Daniel G. Kelly | |

It is certified that error appears in the above-identified patent and that said Letters Patent is hereby corrected as shown below:

On Title Page 2, Item (56), under U.S. Patent Documents, (16th Reference) delete "Amitari" and replace with --Amitai--.

On Title Page 2, Item (56), under U.S. Patent Documents, (25th Reference) delete "Amitari" and replace with --Amitai--.

In the Claims:

In Column 8, line 22, (claim 4, line 2) delete "minor" and replace with --mirror--.

Signed and Sealed this
Twentieth Day of August, 2013

Teresa Stanek Rea
*Acting Director of the United States Patent and Trademark Office*